Jan. 4, 1927. 1,613,502
D. H. COUCH
SHAFT COUPLING
Filed Nov. 3, 1923 3 Sheets-Sheet 2
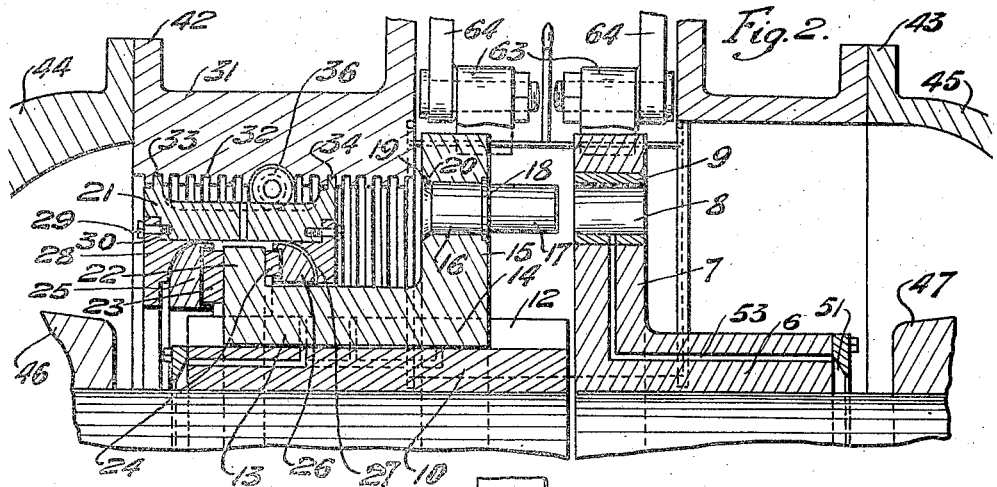
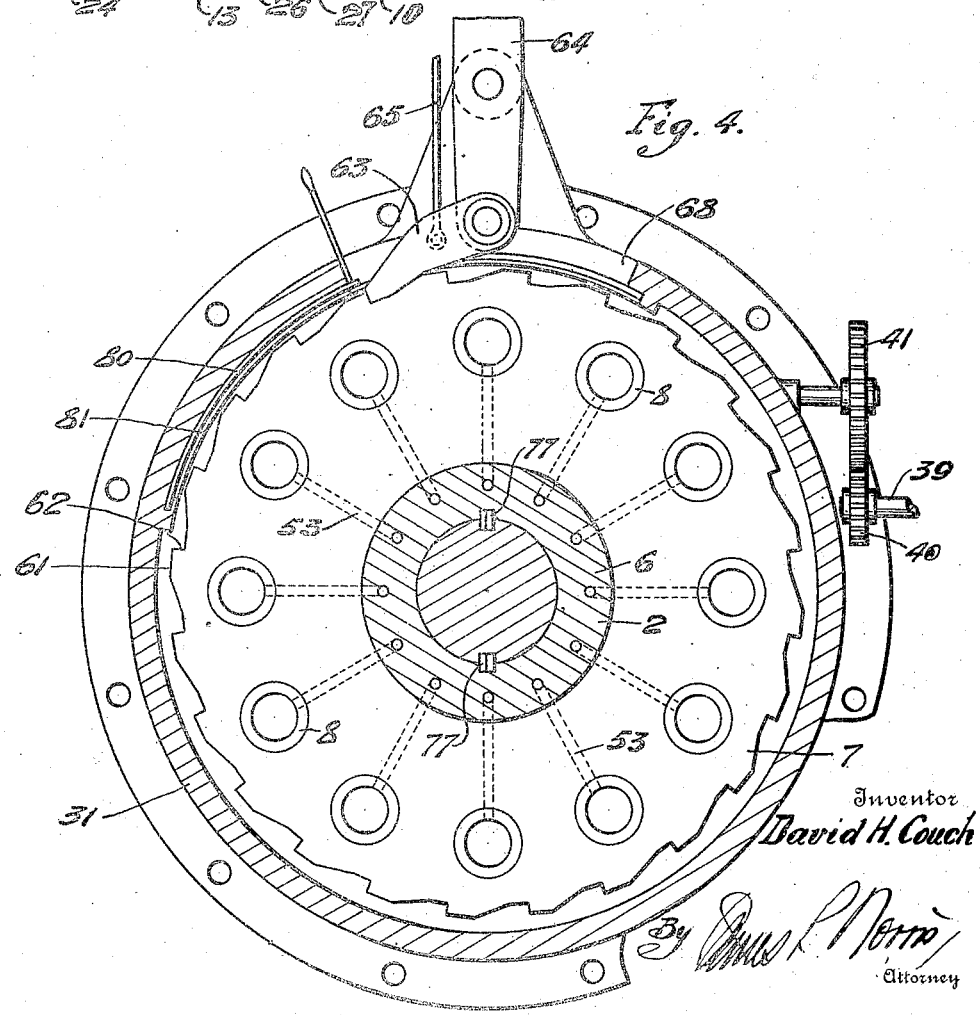
Inventor
David H. Couch
By [signature]
Attorney

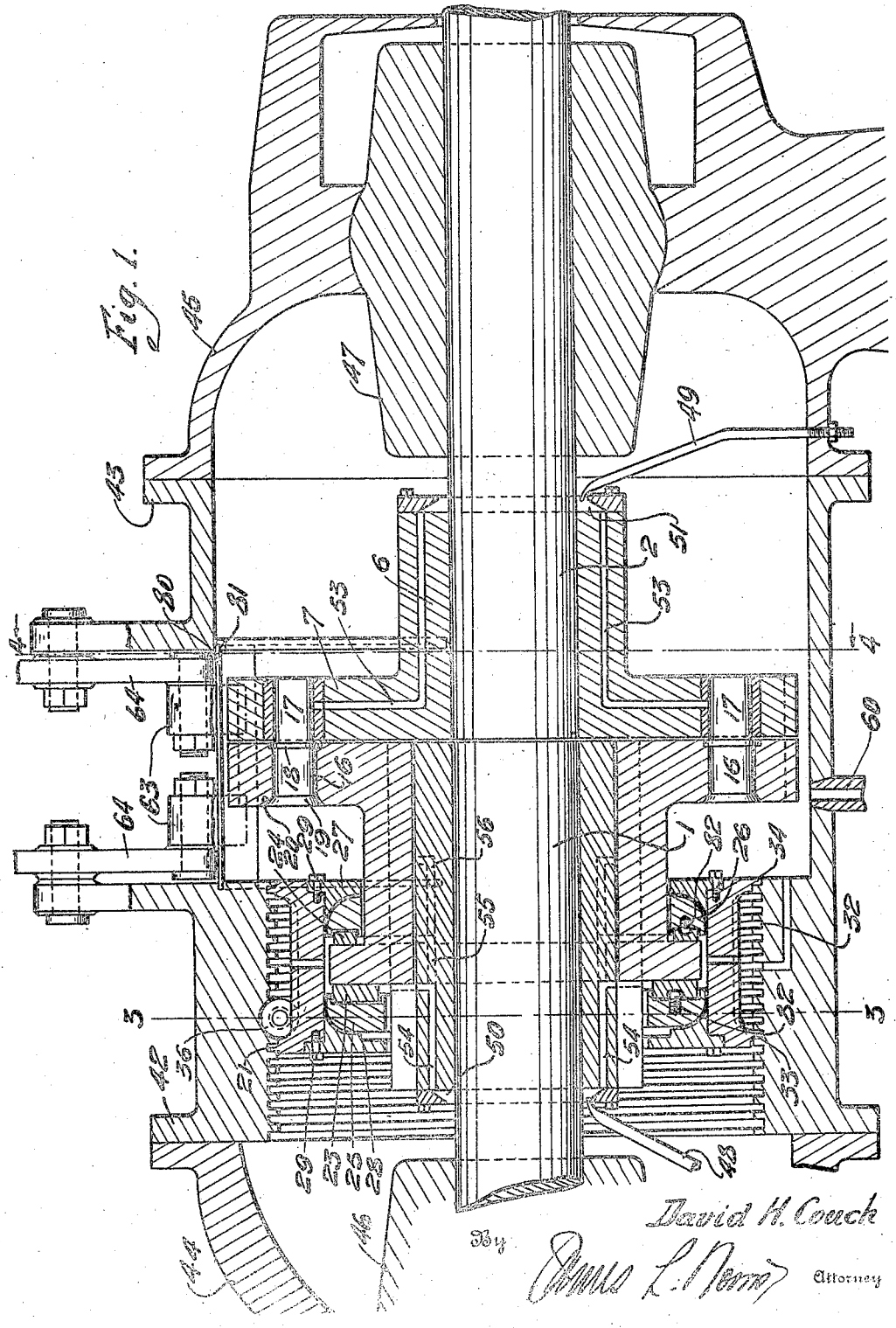

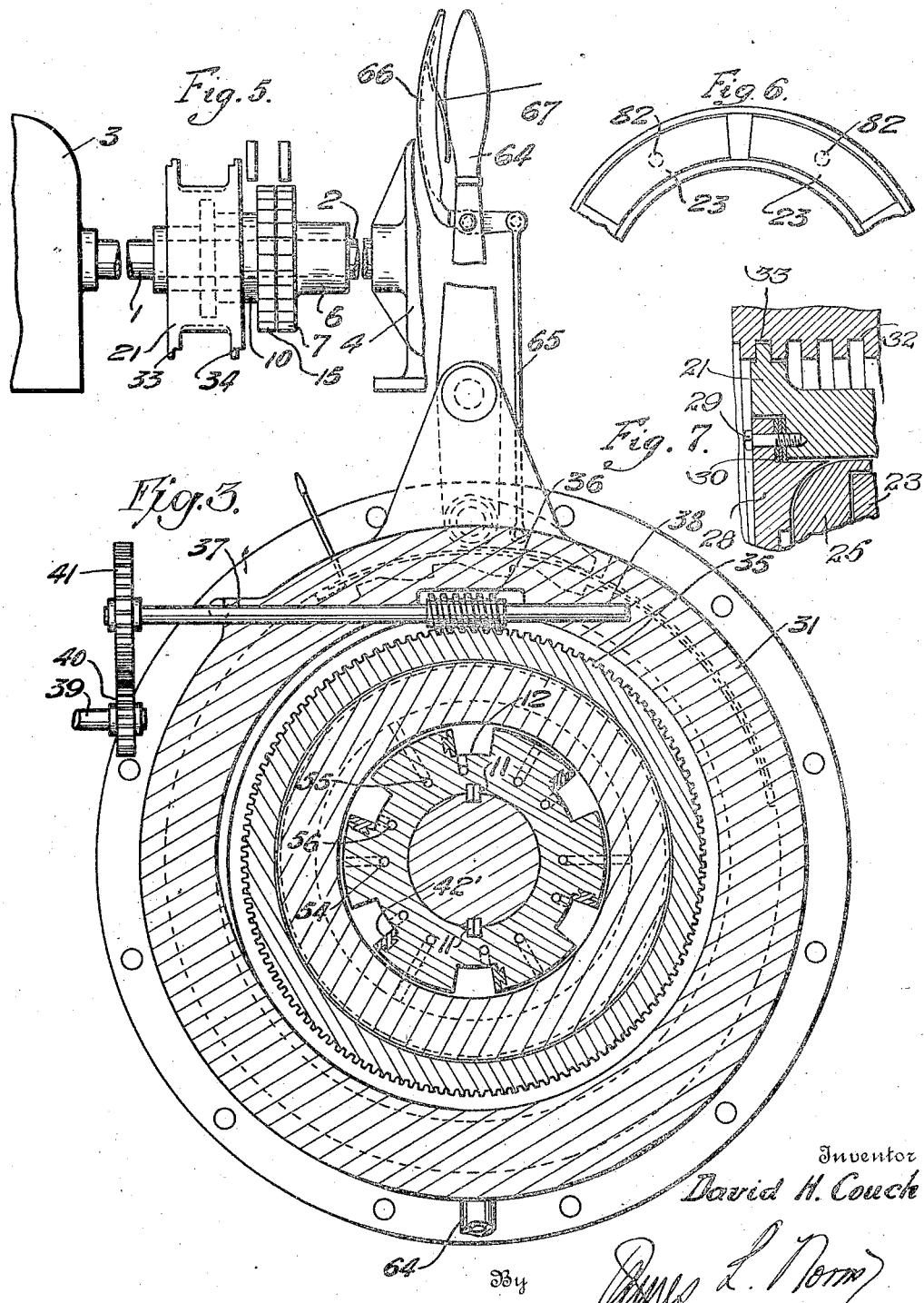

Patented Jan. 4, 1927.

1,613,502

UNITED STATES PATENT OFFICE.

DAVID H. COUCH, OF WARWICK, RHODE ISLAND.

SHAFT COUPLING.

Application filed November 3, 1923. Serial No. 672,611.

This invention relates to shaft couplings generally, and in particular to that type of coupling which finds its chief adaptation in the coupling together of turbo-alternators or other high speed, high power machines where it is not feasible to use the usual type of clutch.

The principal object of the invention, as exemplified in the preferred embodiment described in the present specification, is to provide a safe, reliable, and rapid means of disconnecting alternating current electric generators from their prime movers, to allow the generators to float on the lines as synchronous condensers, for power factor correction. Such generators, if permitted to lie idle are of no use to the power station, but when disconnected from their prime movers they may be operated as synchronous motors, or as is usually termed, synchronous condensers, which, when their fields are properly excited, perform the very important function of improving the power factor of the machines which remain in operation.

Other objects will appear in the specification and claims appended thereto.

The objects are attained by providing a coupling constituted by separable halves, mounted respectively, upon the adjacent ends of shafts of the prime mover and driven machine, making one-half of the coupling movable parallel with the shaft on which it is mounted, so that, when it is desired to disconnect the machines, the movable half of the coupling may be disengaged from the other half by sliding said movable half along the shaft or bushing on which it is mounted. With steam turbo-generators it will usually be possible to disconnect the coupling while the machines are operating at synchronous speed by reducing the load on the turbine to zero, the steam supply to the turbine still being sufficient to rotate the turbine at the same speed as that of the generator, which will now be floating on the line as a synchronous condenser. If desired, or in some other applications of this coupling, the machines may be shut down until the coupling is disconnected and one of them may be started up independently of the other.

The coupling may be connected or engaged in the reverse manner to the above, that is, by sliding the movable half along its support until the two halves of the coupling are properly enmeshed. This may be done with the machines either at rest or when operating. If done while they are at rest it may be necessary to rotate one of the machines slightly until the coupling is lined up properly to engage. If done while the machines are operating, it will be necessary to bring the incoming machine up to the same speed as the other and close the coupling when the two halves are properly in line.

The principal advantages of this coupling are: first, the rugged nature of its construction adapts it to high speed, high power service, for which there is no satisfactory clutch of the usual type now on the market; second, it is absolutely positive in its action since there is no possibility of slip after it is engaged; third, it is extremely simple in its construction and requires practically no expense for maintenance; and fourth, it is small and compact and can readily be applied to existing machines.

In the drawings:—

Figure 1 is a longitudinal section taken through the coupling, the separable parts being shown engaged.

Figure 2 is a similar view of a portion of the coupling showing the parts separated.

Figure 3 is a section taken along the line 3—3 of Figure 1.

Figure 4 is a section taken along the line 4—4 of Figure 1, viewed in the direction of the arrows.

Figure 5 is a diagrammatic representation of the coupling in operative position upon the adjacent shaft ends of an alternating current generator and a turbine or other prime mover.

Figure 6 is a detail of the thrust bearing.

Figure 7 is a detail in section showing the shims between the carrier and the closure member therefor, for determining the clearance in the bearings.

Referring now in detail to the several figures, the numerals 1 and 2 represent, respectively, the adjacent shaft ends of the shafts of the turbine 3 and alternating current generator 4, a portion of which is shown in Figure 5. The nature and construction of the driving and driven machines between which my improved coupling is intercalated is, however, immaterial to the invention, the machines shown and described being merely illustrative of a preferred use of the invention.

The coupling is preferably formed in operative halves associated with the ends of the respective shafts, one-half being constituted by the flanged sleeve 6 which is keyed or otherwise secured to the shaft 2 as by means of the keys 77, shown in Figure 4. Said sleeve is formed at its outer end with a peripheral flange 7 presenting a substantially flat face toward the outer end of said shaft and being provided with a circular series of apertures 8 extending therethrough, said apertures being lined with soft metal bushings 9 of bronze or other suitable material.

The cooperating or active half of the coupling comprises, in the form shown, a sleeve 10, which may be of uniform diameter and is keyed to the shaft 1 by suitable keys or other securing means as shown at 11 in Figure 3. The sleeve 10 is formed on its exterior surface with longitudinal spline grooves 12. A clutch member 13 is mounted to slide upon the sleeve 10, and is formed with longitudinal ribs 14 upon its inner cylindrical surface, which coact with the spline grooves 12 of the sleeve 10 preventing relative rotation of the parts. Since the preferred form of the coupling is designed to be unidirectional in its normal rotation, the leading sides of the spline grooves 12 may be protected from wear by suitable anti-friction wear plates 42'. The clutch member 13 is formed with a flange 15 presenting a substantially flat face toward the outer side of the flange 7, being complementary thereto. The flange 15 is provided with a circular series of apertures in the zone of the apertures 8, in which are mounted, in any suitable manner, pins 16 having projecting portions 17 adapted to enter the apertures 8 when the clutch member 13 is slid in one direction and to leave said apertures when said clutch member is oppositely moved. The pins 16 may be suitably secured to the flange 15 and are here shown as being formed with a shoulder 18 fitting into a rabbeted seat surrounding the pin and riveted at its opposite end, as shown at 19, to conform to a flared seat 20 in the flange 15.

The clutch member 13 is made to reciprocate upon the sleeve 10, for the purpose of engaging or disengaging the coupling, by means consisting of an annular carrier 21, surrounding the coupling member 13. The latter projects through an opening in the carrier 21 and is formed with a flange 22 at its inner end, the latter being confined between annular bearing members 23 and 24. Each of said bearing members consists of a plurality of arcuate pieces arranged end to end and independently pivotally mounted as shown at 82 in Figure 1, within an annular channel formed in the bearing supports 25 and 26, in such a manner as to rock or tip in a longitudinal direction when relative movement takes place, leaving wedge shaped spaces between the faces of the flange 22 and said bearing members which become filled with oil with which the coupling is supplied, the bearing members floating upon oil wedges. The outer surfaces of the bearing supports are formed in part with a spherical curvature and arranged in contact with similarly shaped seats provided respectively within said carrier adjacent its inner end as shown at 27, and in a closure member 28 at the outer end of the carrier. Said closure member preferably is held in engagement with the carrier by cap bolts 29 and is adjustable longitudinally of said carrier by means of shims 30 (Fig. 7) to regulate the clearance of the bearing member with respect to the flange 22.

The carrier is surrounded by a casing 31 of which the inner wall may be deeply threaded, as shown at 32, for engagement with flanges 33 and 34 formed on the outer surface of the carrier and having a curvature corresponding to the pitch of the threads 32. When the carrier is given a rotary motion, by any suitable means, it simultaneously partakes of a longitudinal reciprocatory movement, occasioned by the travel of the flanges 33 and 34 along the threads 32. The clutch member 13, having a portion thereof retained within said carrier, is moved longitudinally in either direction and the projecting portions 17 of the pins 16 are in this manner introduced into or withdrawn from the apertures 8, thereby engaging or disengaging the parts of the coupling. The rotary movement of the carrier is produced in the preferred example here shown, by the co-action of a worm 36 upon spiral grooves 35 formed in the outer surface of the carrier. The worm 36 is preferably mounted in bearings 37 and 38 in the casing 31. Said worm may be driven by a source of power, if desired, which in the drawings is indicated by the lay shaft 39 and the reduction gearing 40 and 41.

It is obvious that, instead of providing the shaft 1 with the sleeve 10, as shown in the drawings, said sleeve may, instead, be formed as an integral part of the shaft 1, the latter being provided directly with spline grooves in its outer surface, adjacent one end. However, since shafting of uniform diameter is generally found in installations of this nature, and for the further reason that the sleeve 10 lends itself as an element in an efficient lubricating system for the coupling of a separable sleeve as shown, the construction shown is preferred.

The lubrication system may be of the forced circulation type, to which end the casing 31 is prolonged so as to surround the coupling for its entire length. Said casing, as shown, is provided with end flanges 42 and 43 which abut against cupped bearing pieces 44 and 45 respectively the latter supporting the respective shafts 1 and 2 by means of the bearings 46 and 47. The casing, together with the cupped bearing pieces, forms a chamber enclosing the coupling, and within which a circulation of lubricating fluid may be maintained. While the lubrication system herein proposed is only one of many that may be advantageously adopted, it presents points of advantage which have determined its selection as illustrating the preferred form of the invention. The bearings 46 and 47 are usually equipped for forced lubrication, the oil thus supplied flowing out of the ends of the bearings and finds its way back to the oil pump through return oil lines, only one of which, 60, is shown. Much of this oil finds its way along the shafts 1 and 2 and is caught by the lubricating channels 50 and 51 and conveyed to the bearing surfaces through bores 53, 54, 55 and 56. In the event that the oil thus supplied should not be sufficient, auxiliary oil supply pipes 48 and 49, which are connected to the oil supply system are provided for delivering an additional quantity of oil directly into the lubricating channels 50 and 51. The inactive or fixed half of the coupling is bored through, as shown at 53 said bores communicating with the lubricating channel 51 and the walls of the apertures 8. Oil entering the groove 51 is forced into the bores 53, finally reaching the walls of the apertures 8 and affording lubricating seats in the apertures 8 for the reception of the pins 16. The movable half of the bearing is lubricated by oil which is forced from the channel 50 through bores 54 and 55, lubricating the bearing members 23 and 24, respectively, and through the bore 56 to the bottoms of the spline grooves, lubricating the wear plates 42'.

While my improved coupling is generally used to connect or disconnect machines while running synchronously, yet it may be desired to couple or uncouple these machines when they are at rest. As said machines are generally quite massive and oppose considerable inertia to turning by hand, I have provided means for bringing either half of the coupling in alignment with the other half. Of course, it is not necessary that both of the coupling halves should be movable to align the same, but as one machine may possess considerably more inertia than the other, I have found it advantageous to provide for alignment of the coupling by turning either half of the same. For this purpose the peripheral faces of the flanges 7 and 15 are formed with ratchet teeth 61 having abrupt shoulders 62 all facing in the same direction and engageable by a pawl 63, which projects through a slot 68 in the casing 31 and is associated with a hand lever 64. Said pawl is connected by a link 65 to a hand lever 66, and is normally kept out of the path of the teeth 61 by means of a spring 67. When it is desired to jack the one half of the coupling into alignment with the other half, the hand levers 64 and 66 are pressed together, inhibiting the tension of the spring 67 and depressing the pawl 63 into the path of said teeth. By oscillating said lever in the proper direction, one of the halves of the coupling may be moved through an angle sufficient to bring it into alignment with the other half. It is to be understood that the aligning means here shown are merely exemplary and do not by any means suggest any structural limitation to be imposed upon the invention. The slot 68 may be normally closed by a slide 80, which underlies the wall of said casing and is operable in guide grooves 81 formed at the sides of the slot.

In operating my improved coupling in a turbo-generator system of the kind indicated, it is essential, when uncoupling the generator from the prime mover when the parts are running, first, to remove the generator load from the prime mover, thus allowing the generator to float on the lines as a synchronous motor, at the same time keeping sufficient energy flowing to the prime mover to keep it rotating without any assistance from the generator now operating as a motor. With the machines operating under these conditions, the worm 36 may be operated and the pins withdrawn from the apertures 8. In recoupling the machines, while running, the reverse operation is performed, the speeds being maintained equal. When coupling or uncoupling the machines while standing still, it may be necessary, due to the ponderous character of the machines, to employ the mechanical means hereinbefore illustrated and described or their equivalents for bringing the coupling halves into alignment for which the worm 36 is operated in the usual well known manner to bring the clutch parts into or out of mutual engagement.

It will be understood that no specific description herein contained is intended to put any limitations upon the scope of the appended claims which does not inhere in the language thereof.

Having described my invention what I claim as new and desire to secure by Letters Patent, is:

1. A disconnectible coupling for aligned driving and driven shafts comprising inter-engageable members rotatable with said respective shafts, one of said members being mounted for relative longitudinal movement with respect to its shaft, inter-threaded fixed and movable elements, said movable element being hollow, a flange forming a part of the movable member of the coupling arranged within the hollow of the movable element, said flange having parallel opposite faces, bearing supports fixed within said movable element and arranged to confine said flange within said movable element, bearing members carried by said bearing supports and mounted to rock in the direction of relative rotation of said coupling members, adjusting means engaging said movable element and co-acting with said bearing supports to adjust the clearance between the bearing members and the movable member and means for rotating said movable element to impart longitudinal movement thereto, through co-action of said movable element with said fixed element.

2. A disconnectible coupling for aligned driving and driven shafts, comprising interengageable members rotatable with said respective shafts, one of said members being mounted for relative longitudinal movement with respect to its shaft, inter-threaded fixed and movable elements, said movable element being hollow, a flange forming a part of the movable member of the coupling arranged within the hollow of the movable element, said flange having parallel opposite faces, bearing supports fixed within said movable element and arranged to confine said flange within said movable element, bearing members carried by said bearing supports and mounted to rock in the direction of relative rotation of said coupling members, adjusting means engaging said movable element and co-acting with said bearing supports to adjust the clearance between the bearing members and the movable member, said bearing supports being formed with seats of spherical curvature co-operating with similar seats within said movable element and upon said adjusting means, and means for rotating said movable element to impart longitudinal movement thereto through co-action of said movable element with said fixed element.

3. A disconnectible coupling for aligned driving and driven shafts comprising sleeves fixed on the adjacent ends of the respective shafts, one of said sleeves being flanged and the other formed with spline grooves, a longitudinally movable member cooperably mounted on the splineably grooved sleeve, said member being formed with a flange co-operating with the first named flange, interengaging means carried by said flanges, means for imparting longitudinal movement to said movable member, said sleeves being provided with oil collecting channels, and formed with ducts leading from said channels to the co-acting surfaces between said splineably grooved sleeve and the movable member and between the co-acting surfaces of said interengaging means, and means for supplying oil to said channels.

In testimony whereof I have hereunto set my hand.

DAVID H. COUCH.